(12) United States Patent
Plank et al.

(10) Patent No.: US 11,454,648 B2
(45) Date of Patent: Sep. 27, 2022

(54) MULTIFUNCTIONAL NANOPROBES FOR SCANNING PROBE MICROSCOPY

(71) Applicant: GETec Microscopy GmbH, Vienna (AT)

(72) Inventors: Harald Plank, Vienna (AT); Jurgen Sattelkow, Vienna (AT); Robert Winkler, Vienna (AT); Christian Schwalb, Vienna (AT)

(73) Assignee: GETEC MICROSCOPY GMBH, Vienna (AT)

( * ) Notice: Subject to any disclaimer, the term of this patent is extended or adjusted under 35 U.S.C. 154(b) by 0 days.

(21) Appl. No.: 17/102,900

(22) Filed: Nov. 24, 2020

(65) Prior Publication Data

US 2022/0163560 A1 May 26, 2022

(51) Int. Cl.
| | |
|---|---|
| *G01Q 60/40* | (2010.01) |
| *G01Q 30/02* | (2010.01) |
| *G01Q 30/20* | (2010.01) |
| *B82Y 15/00* | (2011.01) |
| *B82Y 35/00* | (2011.01) |

(52) U.S. Cl.
CPC ............. *G01Q 60/40* (2013.01); *G01Q 30/02* (2013.01); *G01Q 30/20* (2013.01); *B82Y 15/00* (2013.01); *B82Y 35/00* (2013.01)

(58) Field of Classification Search
CPC ......... G01Q 60/40; G01Q 30/02; G01Q 30/20
USPC ......... 850/40, 41, 42, 56, 57, 58, 59, 60, 61
See application file for complete search history.

(56) References Cited

U.S. PATENT DOCUMENTS

| | | | |
|---|---|---|---|
| 2006/0150720 A1* | 7/2006 | Nakayama | G01Q 60/54 73/105 |
| 2014/0173786 A1* | 6/2014 | Flanders | G01Q 60/40 977/762 |

OTHER PUBLICATIONS

Micromachines. "Focused Electron Beam-Based 3D Nanoprinting forScanning Probe Microscopy: A Review;" Harold Plank et al.; http://www.mdpi.com/joumal/micromachines.

* cited by examiner

*Primary Examiner* — Nicole M Ippolito
(74) *Attorney, Agent, or Firm* — Stetina Brunda Garred & Brucker (57) ABSTRACT

A multi-functional scanning probe microscopy nanoprobe may include a cantilever, a tapered structure formed on a surface of the cantilever from a first material, and a nanopillar formed on an apex of the tapered structure from a second material. One of the first and second materials may exhibit ferromagnetism and the other may have greater electrical conductivity. A method of simultaneous multimode operation during scanning probe microscopy may include scanning a sample with the nanoprobe in contact with the sample to produce a current measurement indicative of an electric current flowing through the sample and a height measurement indicative of a topography of the sample and, thereafter, scanning the sample with the nanoprobe oscillating about a lift height derived from the height measurement to produce a deflection measurement (e.g. phase shift) indicative of a magnetic force between the sample and the nanoprobe.

22 Claims, 7 Drawing Sheets

MULTIFUNCTIONAL NANOPROBES FOR SCANNING PROBE MICROSCOPY

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to scanning probe microscopy (SPM) such as atomic force microscopy (AFM) and, more particularly, to multifunctional nanoprobes that allow for simultaneous multi-mode operation.

2. Related Art

Atomic force microscopy (AFM) and other types of scanning probe microscopy (SPM) make use of specialized nanoprobes to scan a sample in order to characterize the physical properties of the sample down to the nanoscale. Among such nanoprobes are those comprising a silicon cantilever with an integral tip, shaped to have an apex radius of less than a few tens of nanometers, that are either coated with electrically conductive materials to be used for electrically-based SPM modes such as conductive atomic force microscopy (C-AFM), electrostatic force microscopy (EFM), and Kelvin probe force microscopy (KPFM or KFM) or are coated with magnetic materials to be used for magnetic force microscopy (MFM). Each specialized nanoprobe is conventionally fabricated by full, large-area coating of the silicon tip with the desired material. Since such nanoprobes have only a single dominating functionality aside from height scanning, the nanoprobes must be exchanged for different operation modes (e.g. MFM and C-AFM). As a result, when scanning the sample in two different modes, a direct correlation of individual surface regions of the sample or nanoscale features can become very challenging or even impossible, since the exchange of the nanoprobe necessarily entails losing the precise scanning position on the sample.

BRIEF SUMMARY

The present disclosure contemplates various devices and methods for overcoming the drawbacks accompanying the related art. One aspect of the embodiments of the present disclosure is a multi-functional SPM nanoprobe. The nanoprobe may comprise a cantilever, a tapered structure formed on a surface of the cantilever from a first material, and a nanopillar formed on an apex of the tapered structure from a second material. One of the first and second materials may have greater electrical conductivity and the other may exhibit ferromagnetism and thus a spontaneous magnetic moment even in zero applied magnetic fields.

The first material may exhibit ferromagnetism (and may have greater magnetic coercivity, for example) and the second material may have the greater electrical conductivity. The first material may include one or more elemental ferromagnetic species, for example but not limited to one or more selected from the group consisting of iron (Fe), cobalt (Co), nickel (Ni), gadolinium (Gd), terbium (Tb), and dysprosium (Dy). The first material may include one or more ferromagnetic alloys, for example but not limited to one or more selected from the group consisting of $Co_3Fe$, $CrO_2$, $CrBr_3$, and EuS. The second material may include one or more highly conductive materials, for example but not limited to one or more noble metals selected from the group consisting of platinum (Pt), palladium (Pd), gold (Au), and silver (Ag).

The tapered structure may comprise a hollow cone or pyramid.

Another aspect of the embodiments of the present disclosure is a scanning probe microscope comprising the above nanoprobe and a detector for detecting a deflection of the cantilever. The detector may be an external detector or an integrated piezo-resistive circuit that can be probed to determine the deflection of the cantilever, for example.

Another aspect of the embodiments of the present disclosure is a method of simultaneous multi-mode operation during SPM. The method may comprise scanning a sample with the above nanoprobe in contact with the sample to produce a current measurement indicative of an electric current flowing through the sample and a height measurement indicative of a topography of the sample and, thereafter (e.g. within the same workflow), scanning the sample with the same nanoprobe oscillating about a lift height derived from the height measurement to produce a deflection measurement indicative of a long-range magnetic force if the tip is magnetic and/or electrostatic force if the tip is electrically conductive between the sample and the nanoprobe. The deflection measurement may be in the form of a phase shift measurement, for example.

Another aspect of the embodiments of the present disclosure is a method of simultaneous multi-mode operation during SPM. The method may comprise scanning a sample with the above nanoprobe in dynamic contact mode where the probe is driven below resonance and the amplitude of the response is indicative of the sample stiffness, in addition to producing a height measurement indicative of a topography of the sample and, thereafter (e.g. within the same workflow), scanning the sample with the same nanoprobe oscillating about a lift height derived from the height measurement to produce a deflection measurement indicative of a long-range magnetic force if the tip is magnetic and/or electrostatic force if the tip is electrically conductive between the sample and the nanoprobe. The deflection measurement may be in the form of a phase shift measurement, for example.

Another aspect of the embodiments of the present disclosure is a generic extension of the multi-mode operation to include multi-scanning passes beyond the two described above (specifically in contact and then lift mode). These might include a first scan in contact mode to extract height and friction and other nanomechanical properties of the sample in addition to conductivity measurements at the nanoscale followed by a number of scans in lift mode where the probe is held (1) at a constant height to obtain quantitative measure of the sample potential (i.e. KPM), (2) at a constant height but dynamically oscillated at its resonant frequency to sense long range electrostatic forces as a phase shift of the deflection (EFM), (3) at a constant height and dynamically oscillated with an additional feedback loop to sense the long range magnetic forces between the probe and the sample.

Another aspect of the embodiments of the present disclosure allows for an almost arbitrary combination of consecutive scans in different modes all realized without changing the nanoprobe within a single workflow.

Another aspect of the embodiments of the present disclosure is a multi-functional scanning probe microscopy nanoprobe. The nanoprobe may comprise a cantilever, first and second electrodes formed on a surface of the cantilever from a first material, a nanobridge bridging the first and second electrodes, and a nanopillar formed on the nanobridge. Either one or both of the nanobridge and the nanopillar may be formed of a second material. One of the first and second materials may exhibit ferromagnetism.

The other of the first and second materials may have greater electrical conductivity. The first material may exhibit ferromagnetism (and may have a specific magnetic coercivity value designed to maximize the probe tip—sample interaction, for example) and the second material may have the greater electrical conductivity. The first material may include one or more elemental ferromagnetic species, for example but not limited to one or more selected from the group consisting of iron, cobalt, nickel, gadolinium, terbium, and dysprosium. The first material may include one or more ferromagnetic alloys, for example but not limited to one or more selected from the group consisting of $Co_3Fe$, $CrO_2$, $CrBr_3$, and EuS. The second material may include one or more highly conductive materials, for example but not limited to one or more noble metals selected from the group consisting of platinum, palladium, gold, and silver.

Another aspect of the embodiments of the present disclosure is a scanning probe microscope comprising the above nanoprobe and a detector for detecting a deflection of the cantilever. The detector may be an external detector or an integrated piezo-resistive circuit that can be probed to determine the deflection of the cantilever, for example.

Another aspect of the embodiments of the present disclosure is a method of simultaneous multi-mode operation during SPM. The method may comprise scanning a sample with the above nanoprobe in contact with the sample to produce a thermal measurement indicative of a temperature and/or thermal conductivity of the sample and a height measurement indicative of a topography of the sample and, thereafter, scanning the sample with the nanoprobe oscillating about a lift height derived from the height measurement to produce a deflection measurement indicative of a magnetic force between the sample and the nanoprobe. The thermal measurement may be an indirect thermal measurement produced via temperature dependent electric resistivities through the nanoprobe, for example. The deflection measurement may be in the form of a phase shift measurement, for example.

Another aspect of the embodiments of the present disclosure is a method of simultaneous multi-mode operation during SPM. The method may comprise scanning a sample with the above nanoprobe in contact with the sample to produce local thermal analysis by locally melting the sample indicative of the local melting and glass transition points of the sample and a height measurement indicative of a topography of the sample and, thereafter, scanning the sample with the nanoprobe oscillating about a lift height derived from the height measurement to produce a deflection measurement indicative of a magnetic force between the sample and the nanoprobe. The thermal measurement may be an indirect thermal measurement produced via temperature dependent electric resistivities through the nanoprobe, for example. The deflection measurement may be in the form of a phase shift measurement, for example.

Another aspect of the embodiments of the present disclosure is a method of fabricating a multi-functional scanning probe microscopy nanoprobe. The method may comprise directing a nozzle of a gas injection system at a surface to supply molecules of a first precursor to the surface, irradiating the molecules of the first precursor with a focused electron beam to dissociate the molecules of the first precursor into volatile fragments that leave the surface and non-volatile fragments that form a first solid deposit on the surface, translating the surface relative to the focused electron beam during said irradiating the molecules of the first precursor to shape the first solid deposit in three dimensions, directing a nozzle of the gas injection system at the surface to supply molecules of a second precursor to the surface, and irradiating the molecules of the second precursor with the focused electron beam to dissociate the molecules of the second precursor into volatile fragments that leave the surface and non-volatile fragments that form a second solid deposit on the first solid deposit. One of the first and second solid deposits may have greater electrical conductivity and the other may exhibit ferromagnetism.

The first solid deposit may exhibit ferromagnetism (and may have greater magnetic coercivity, for example) and the second solid deposit may have the greater electrical conductivity. The first solid deposit may include one or more elemental ferromagnetic species, for example but not limited to one or more selected from the group consisting of iron, cobalt, nickel, gadolinium, terbium, and dysprosium. The first solid deposit may include one or more ferromagnetic alloys, for example but not limited to one or more selected from the group consisting of $Co_3Fe$, $CrO_2$, $CrBr_3$, and EuS. The second solid deposit may include one or more highly conductive materials, for example but not limited to one or more noble metals selected from the group consisting of platinum, palladium, gold, and silver.

The surface may be a surface of a pre-existing scanning probe microscopy nanoprobe.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of multifunctional nanoprobes and methods of simultaneous multi-mode operation thereof during SPM. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
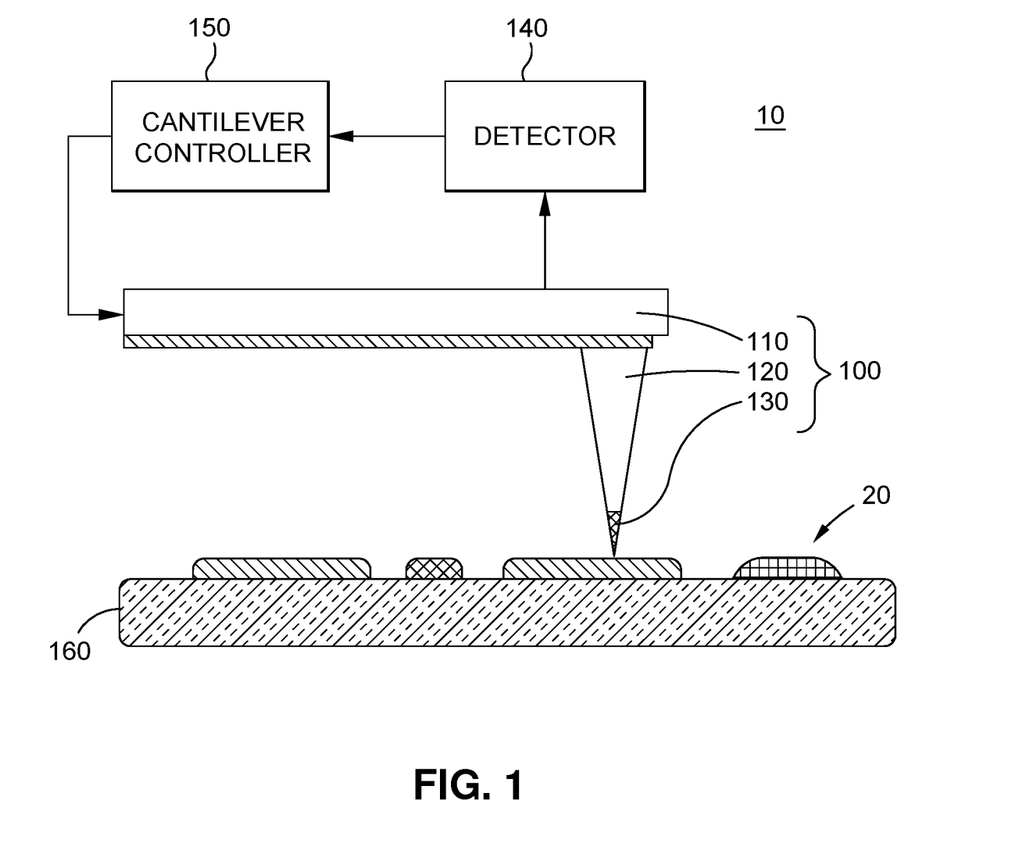
FIG. 1 shows a scanning probe microscope including a multi-functional scanning probe microscopy nanoprobe according to an embodiment of the present disclosure, along with a sample to be analyzed.

FIG. 1 shows a scanning probe microscope 10 including a multi-functional scanning probe microscopy nanoprobe 100 according to an embodiment of the present disclosure, along with a sample 20 to be analyzed. The nanoprobe 100 may include a cantilever 110 that allows the nanoprobe 100 to move toward and away from the sample 20 during a scanning operation of the scanning probe microscope 10. As the nanoprobe 100 interacts with the sample 20, the interaction forces cause the cantilever 110 to deflect. A detector 140 of the scanning probe microscope 10 detects the deflection of the cantilever 110 and provides a result of the detection as a feedback signal to a cantilever controller 150 of the scanning probe microscope 10, which in turn controls a height and/or oscillation of the cantilever 110 (and possibly a position of a stage 160 holding the sample 20) in response to the feedback signal. A measurement result for the sample 20 may be derived from the detection result, feedback signal, and/or cantilever control signal, accordingly.

In addition to interaction forces that cause a deflection of the cantilever 110, which may include contact and long-range forces (magnetic, electrostatic, etc.) between the nanoprobe 100 and the sample 20, additional characteristics of the sample 20 may be measured at a given position using the nanoprobe 100 including an electric current flowing through the nanoprobe 100 and the sample 20 and/or a temperature of the sample 20 (e.g. indirectly measured via electric currents). To this end, the nanoprobe 100 may comprise a structure that is formed on the cantilever 110 from two or more different materials suitable for different measurements of the sample 20. As such, unlike conventional scanning probe microscopes, the disclosed scanning probe microscope 10 having the multi-functional scanning probe microscopy nanoprobe 100 makes it possible to collect a variety of measurements from the same sample 20 in an uninterrupted process without needing to change nanoprobes. The precise position of the nanoprobe 100 on the sample 20 can thus be maintained for multiple different measurements, allowing for accurate characterization of the sample 20.

By way of example, the nanoprobe 100 shown in FIG. 1 comprises a tapered structure 120 formed on a surface of the cantilever 110 from a first material and a nanopillar 130 formed on an apex of the tapered structure 120 from a second material. The tapered structure may comprise a cone or pyramid such as a hollow or solid cone or pyramid. One of the first and second materials may have greater electrical conductivity and may be suitable for C-AFM, for example, while the other may exhibit ferromagnetism and may be suitable for MFM. With such a nanoprobe 100, the sample 20 may be scanned once in a C-AFM mode and then immediately thereafter in an MFM mode, for example, without changing the position of the sample 20 to be scanned (e.g. forward and backward scans at substantially the same or very similar positions).

Figure 2:
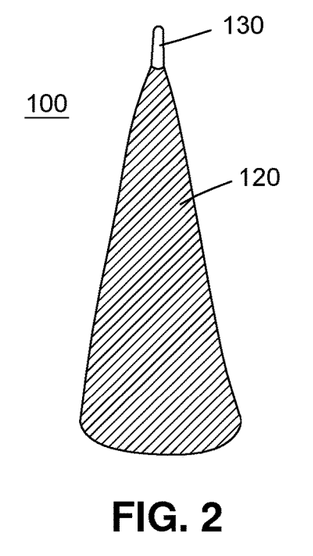
FIG. 2 shows a tapered structure and nanopillar of the nanoprobe described in relation to FIG. 1.

FIG. 2 shows the tapered structure 120 and nanopillar 130 of the nanoprobe 100 described in relation to FIG. 1. In order to produce the tapered structure 120 and nanopillar 130 out of different materials, an additive direct-write fabrication technology may be used such as 3D focused electron beam induced deposition (3D-FEBID). 3D-FEBID uses a fine capillary, which delivers gaseous precursor molecules into the vacuum chamber of a scanning electron microscope (SEM) or a multi-beam microscope such as coupled focused ion beam (FIB)—SEM instrumentations (dual beam microscopes). The precursor molecules adsorb, diffuse and eventually desorb again from the surface of a substrate. When the nanometer-wide, focused electron beam interacts with surface-adsorbed molecules, they are dissociated into volatile and non-volatile parts, with the latter forming a solid deposit. As the electron beam is slowly moved in a lateral direction, the deposit is vertically stacked but laterally displaced, enabling controlled fabrication of even complex freestanding 3D nano-architectures. The final functionality of such architectures is governed by the choice of precursor material, which can be magnetic, electrically conductive, or electrically insulating, for example.

Depending on the precursor materials used, the resulting deposit may have impurities such as carbon or oxygen, which can be removed by post-growth treatments to exploit the full potential of the deposited material. Post-growth treatments may include curing, which irradiates the as-deposited material a second time with the focused electron beam in high-vacuum conditions, triggering four effects: (1) continuing and eventually completing the fragmentation of incompletely dissociated but incorporated precursor molecules, which leads to (2) slight growth of nanocrystals due to metal atoms released by (1), further assisted by (3) thermal annealing due to local beam heating, while (4) the carbon matrix changes from loosely bound polymer networks over sp3 (glassy carbon) towards sp2 hybridized states (amorphous carbon). In this way, curing mainly changes the inner structure of the material, which can impact electrical conductivity and/or magnetic performance as well as its temperature dependence.

By way of example, a hollow cone fabricated via 3D-FEBID from a $(CH_3)_3CH_3C_5H_4Pt$ precursor may have a relatively high electrical resistivity as deposited, with the exact value depending on primary electron energy ($E_0$), beam current ($I_0$), and patterning details but typically ranging from $10^7$ to $10^9$ $\mu\Omega \cdot cm$, compared to $10^1$ $\mu\Omega \cdot cm$ for pure platinum. By exposing the deposit to post-growth e-beam curing as described above, the incompletely dissociated precursor molecules may be further fragmented, resulting in additional platinum atoms being released and attaching to already available platinum nanograins, thus increasing the number of nanograins and reducing the grain-to-grain distance, leading to a decrease in the final resistivity by one to three orders of magnitude. The resulting material may be considered "metal-like" and may have an electrical resistivity ranging from $10^4$ to $10^6$ μΩ·cm, for example, which is still far from that of pure platinum.

While the chemical composition during curing may remain relatively unchanged, contemplated post-growth treatments may alternatively or additionally include purification, which entirely removes impurities such as carbon or oxygen. Here, as-deposited or cured materials are brought in low pressure $H_2O$ environments, e.g. by environmental-SEM (ESEM) instrumentation, and scanned again by the electron beam. This approach allows the water to diffuse inside the deposit, where it becomes dissociated by the electron beam leading to the formation of gaseous, carbon-containing fragments, which leave the deposit again. In other words, purification etches out the carbon, while pure metals are left. The key elements of such a purification process are the application of room temperature water and adapted beam currents to prevent morphological cracking and/or local melting, respectively. By this process, metals become very pure to provide, for example, the highest possible electrical conductivities.

As an example, water vapor may be injected into the SEM chamber at room temperature with an $H_2O$ target pressure of 10 to 100 Pa. As the $H_2O$ diffuses inside the deposit due to the high carbon content of the as-deposited material, the electron beam may be rastered across the sample, which fragments the incorporated water. As a result, radicals are formed, which etches out the carbon to a very high degree. By purifying the 3D-FEBID deposit in this way, the electrical resistivity may be reduced to around $10^2$ to $10^3$ μΩ·cm, close to that of bulk platinum. Although very pure from a chemical point of view, the final resistivities are still higher than for bulk platinum, which is attributed to very low impurities at grain boundaries and/or scattering effects at grain boundaries.

In order to produce the example nanoprobe 100 shown in FIG. 2, which combines MFM and C-AFM capabilities, a tapered structure 120 comprising a hollow cone may be realized by the fabrication of a stack of consecutive rings on the surface of the cantilever 110 using 3D-FEBID, with the rings gradually decreasing in radius until almost a closed structure is formed. The nanopillar 130, which may have an apex radius of less than 10 nm, may be formed on top of the tapered structure 120 using 3D-FEBID by holding the electron beam stationary for a short time (typically on the scale of seconds). As noted above, one of the tapered structure 120 and the nanopillar 130 may exhibit ferromagnetism and may be suitable for MFM, for example, while the other may have greater electrical conductivity and may be suitable for C-AFM. It may be preferable for the tapered structure 120 to be made of the material that exhibits ferromagnetism to avoid mechanical contact between the magnetic material and the sample 20, with the nanopillar 130 being made of the material having greater electrical conductivity, though the reverse is contemplated as well.

For example, the tapered structure 120 may be formed by 3D-FEBID using a magnetic material precursor whose atoms exhibit a net magnetic moment such as an iron-containing precursor (e.g. $Fe(CO)_5$ or $Fe_2(CO)_9$) or a cobalt-containing precursor (e.g. $Co_2(CO)_8$). Particularly promising are heteronuclear Fe—Co precursors such as $HCo_3Fe(CO)_{12}$, which has been found to produce a resulting $Co_3Fe$ deposit that is nominally carbon-/oxygen-free except for an unavoidable surface oxidation layer. Such high purity in the as-deposited material is especially important for the ferromagnetic property to emerge, considering that $H_2O$-assisted purification as described above may not be suitable for magnetic materials due to the occurrence of surface and internal oxidation. In its as-deposited state, $Co_3Fe$ is estimated to have a magnetic coercivity $H_C$ of around 16 to 40 kA/m ($\mu_0 * H_C \approx$ 20-50 mT). By way of comparison, cobalt has a magnetic coercivity $H_C$ of around 0.8 to 72 kA/m and $Fe_2Co$ has a magnetic coercivity $H_C$ of around 20 kA/m. The nanopillar 130 may be formed by 3D-FEBID using an electrically conductive material precursor such as a precursor containing platinum, iridium, or gold.

Figure 3:
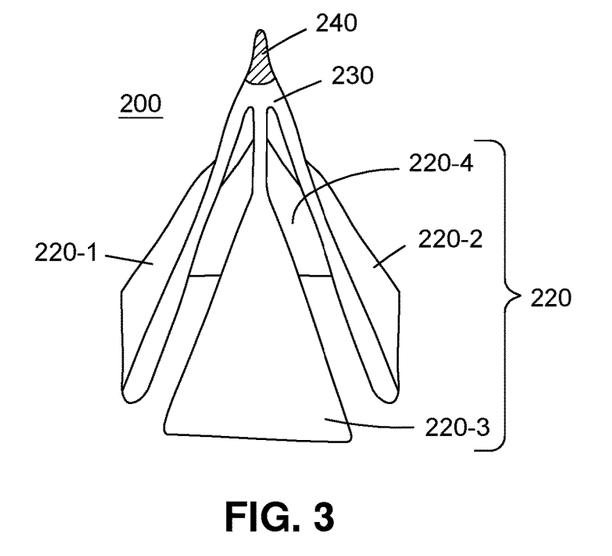
FIG. 3 shows another example nanoprobe that may be used with the scanning probe microscope of FIG. 1.

FIG. 3 shows another example nanoprobe 200 that may be used with the scanning probe microscope 10 of FIG. 1. Whereas the nanoprobe 100 may combine MFM functionality with C-AFM, the nanoprobe 200 may instead combine MFM functionality with thermal functionalities such as thermal sensing via scanning thermal microscopy (SThM) and/or highly localized heating, e.g. nano heating (NH), during thermal scanning probe lithography (tSPL). To this end, the nanoprobe 200 may comprise two or more electrodes 220 that define a rigid base zone and function as extensions of electrodes 212 formed on a specialized cantilever 210 (see FIG. 6), one or more 3D nanobridges 230 bridging first and second electrodes 220-1, 220-2 of the two or more electrodes 220, and a nanopillar 240 (e.g. with an apex radius of less than 10 nm) formed on the one or more nanobridges 230. Like the nanoprobe 100, the nanoprobe 200 may be formed out of two materials having different properties suitable for the different functionalities of the nanoprobe 200, with the nanopillar 240 formed from a different material than the electrodes 220 and nanobridge 230, for example, such as a material that exhibits ferromagnetism. The other material may have greater electrical conductivity, for example.

To produce the electrodes 220, nanobridge 230, and nanopillar 240, a 3D-FEBID process may be used as described above, with the precursors and post-growth treatments selected to produce the desired properties of each component. The electrodes 220 may be formed on the electrodes 212 of the cantilever 210 and may be formed integrally therewith as extensions thereof. The design of the electrodes 220 may vary as needed to fulfill mechanical conditions (e.g. rigidity) and/or to fit the layout of the electrodes 212 of the cantilever 210. The nanobridge(s) 230 may be formed as curved nanowires or merged nano-pillars, for example, that bridge two or more of the electrodes 220. The nanobridge(s) may be formed integrally with the electrodes 220 from the same material (e.g. using the same precursor) as depicted in FIG. 3 during a 3-D FEBID process involving lateral movement of the electron beam. The nanopillar 240 may be formed by applying a stationary beam for a short time as in the example of FIG. 2.

Owing to a positive or negative temperature coefficient (PTC or NTC, respectively) of electrical resistance, the nanoprobe 200 may act as a thermistor. Passive temperature sensing can thus be realized by monitoring electrical resistance (e.g. voltage measurement during constant current operation), which changes as a function of temperature. Active heating can be achieved by electric current modulation, leading to Joule heating. Both modes may require upfront calibration for quantitative SThM or NH operation. To enable active NH operation via feedback control, e.g. for tSPL, additional side branches may be integrated in the nanobridge 230 as shown (e.g. bridging electrodes 220-3 and 220-4) for multi-point resistance measurements. From a materials point of view, the nanopillar 240 may preferably be fabricated from a material that exhibits ferromagnetism to allow MFM functionality. The nanobridge 230 and/or electrodes 220 may be fabricated from nanogranular materials to enable temperature dependent charge transport via thermally assisted tunneling effects. The materials may exhibit NTC characteristics as deposited or after being made into metal-like materials by curing as described above. That is, although many FEBID materials reveal nanogranular materials in their as-deposited state, curing as described above can maximize their sensitivity, allowing precise tunability. The electrodes 200 may preferably have low electrical resistance, which can be achieved by strong curing or even purification treatment as described above (with fully purified materials revealing PTC characteristics), though it is contemplated that materials may be used as deposited in some cases. Final designs, material sequences, and precursor requirements may determine the exact fabrication and post-growth treatment, if any.

Figure 4:
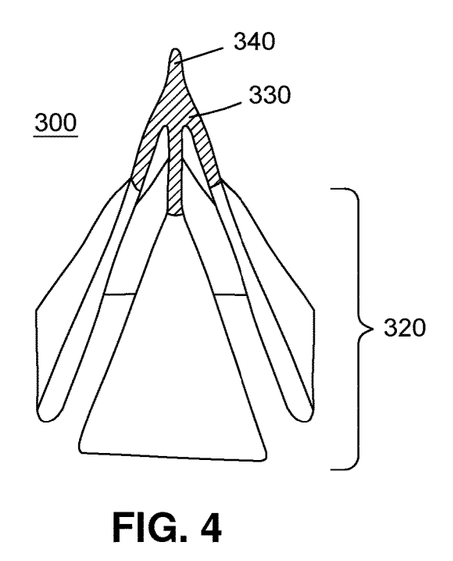
FIG. 4 shows another example nanoprobe that may be used with the scanning probe microscope of FIG. 1.

FIG. 4 shows another example nanoprobe 300 that may be used with the scanning probe microscope 10 of FIG. 1. The nanoprobe 300 may be the same as the nanoprobe 200 of FIG. 3 and may include the cantilever 210 (see FIG. 6) as well as electrodes 320, a nanobridge 330, and a nanopillar 340 that are the same as the electrodes 220, nanobridge 230, and nanopillar 240, respectively, with the following difference. Whereas the nanoprobe 200 of FIG. 3 uses the same material for the nanobridge 230 as for the electrodes 220, the nanobridge 330 of the nanoprobe 300 instead shares the material of the nanopillar 340. For example, in a case where the nanopillar 340 is made of a magnetic material as described above, the magnetic material may extend to the nanobridge 330 as well.

Figure 5:
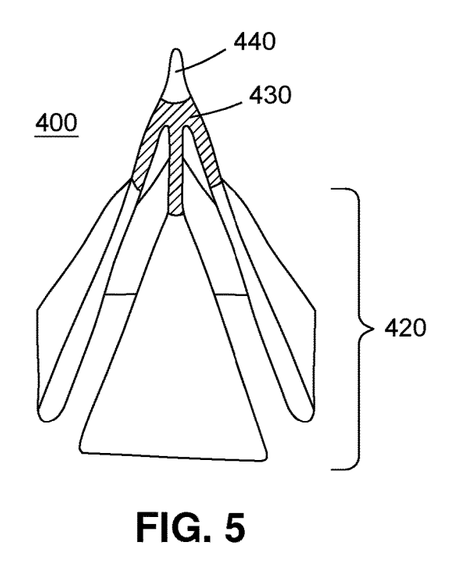
FIG. 5 shows another example nanoprobe that may be used with the scanning probe microscope of FIG. 1.

FIG. 5 shows another example nanoprobe 400 that may be used with the scanning probe microscope 10 of FIG. 1. The nanoprobe 400 may be the same as the nanoprobe 200 of FIG. 3 and may include the cantilever 210 (see FIG. 6) as well as electrodes 420, a nanobridge 430, and a nanopillar 440 that are the same as the electrodes 220, nanobridge 230, and nanopillar 240, respectively, with the following difference. Whereas the nanoprobe 200 of FIG. 3 uses a different material such as one that exhibits ferromagnetism for the nanopillar 240, the nanoprobe 400 instead inserts the different material as the nanobridge 430, with the nanopillar 440 being made of the same material as the electrodes 420 or a third material. For example, if the magnetic material is not desired to get in physical contact with the sample 20, the nanopillar 440 may be made of an electrically conductive or insulating material that does not exhibit ferromagnetism, with ferromagnetic material instead being incorporated in the central nanobridge 230, e.g. by the introduction of additional, magnetic material side branches not actively used for thermal sensing or heating.

Figure 6:
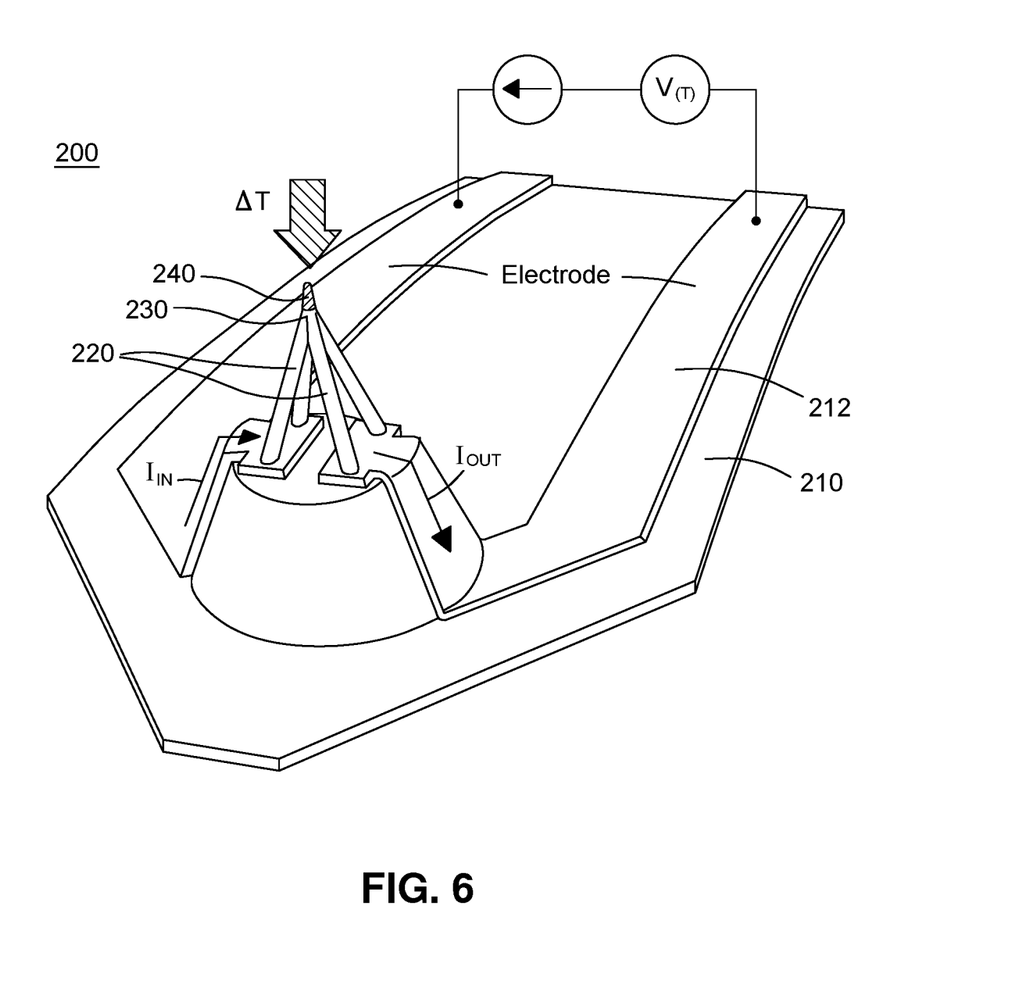
FIG. 6 shows another view of the nanoprobe of FIG. 3, including a cantilever that is specialized for thermal sensing during scanning thermal microscopy (SThM) and/or highly localized heating, e.g. nano heating (NH), during thermal scanning probe lithography (tSPL)

FIG. 6 shows another view of the nanoprobe 200, including the cantilever 210 that is specialized for thermal sensing via SThM and/or NH during tSPL. As shown, a constant electric current may be provided across the nanoprobe 200 acting as a thermistor, and a temperature-dependent voltage may be measured across the electrodes 212 to determine the temperature of the sample 20. Alternatively, an input current may produce controlled resistive heating of the nanoprobe 200 for localized heating of the sample 20. While the illustrated example shows the nanoprobe 200, the structure of the cantilever 210, including electrodes 212, may be the same for use with the nanoprobe 300 of FIG. 4 or the nanoprobe 400 of FIG. 5.

In addition to the nanoprobe 100 of FIG. 2, which may be adapted for C-AFM and MFM functionalities, and the nanoprobe 200, 300, 400 of FIGS. 3-6, which may be adapted for MFM and SThM and/or NH functionalities, the disclosure contemplates other innovative nanoprobes and variants thereof that are adapted for other combinations of functionalities including KPFM/KFM (further denoted as KPFM for clarity) and/or EFM. One contemplated nanoprobe, for example, combines KPFM and/or EFM with thermal functionalities such as SThM (thermal sensing) and/or NH (heating during e.g. tSPL). The morphological design of this concept is very similar to that of the nanoprobes 200, 300, 400 shown in FIGS. 2-4 but does not use magnetic materials at all. Instead, the nanopillar 240 is replaced with a metallic nanopillar formed by subjecting a 3D-FEBID-fabricated solid deposit to a post-growth purification process as described above or with a "metal-like" nanopillar formed by subjecting the deposit to a post-growth curing process. Such a metallic or metal-like nanopillar may enable detection of electric surface properties via KPFM or EFM.

Another contemplated nanoprobe combines MFM with C-AFM and thermal functionalities such as SThM (thermal sensing) and/or NH (heating during e.g. tSPL). From a morphological point of view, this nanoprobe is again similar to the nanoprobes 200, 300, 400 shown in FIGS. 2-4, revealing the same three vertical zones (e.g. electrodes 220, nanobridge 230, nanopillar 240), including possible dislocation of magnetic segments (e.g. for contact-free AFM operation) and/or integration of additional branches (e.g. for active NH operation). The main difference, however, is the material requirements of the electrodes 220 and nanobridge 230, which need to be sufficiently metallic for highly sensitive C-AFM operation. This can be realized by the choice of precursor, which may be highly metallic as deposited or after a post-growth purification process for transforming the material into pure metal. Passive thermal sensing and/or active local heating may still apply for pure metals (e.g. platinum). If the expected target currents are higher, the purification process can be replaced with a post-growth curing process.

Another contemplated nanoprobe combines KPFM and/or EFM with C-AFM and thermal functionalities such as SThM (thermal sensing) and/or NH (heating during e.g. tSPL). The nanoprobe is the same as the above-described nanoprobe that combines MFM with C-AFM and thermal functionalities, except without the integration of magnetic materials. Instead, the nanopillar 240 is replaced with a metallic nanopillar formed by subjecting a 3D-FEBID-fabricated solid deposit to a post-growth purification process as described above or with a "metal-like" nanopillar formed by subjecting the deposit to a post-growth curing process. Such a metallic or metal-like nanopillar may enable detection of electric surface properties via KPFM or EFM, sensing electric instead of magnetic long-range forces.

In general, nanoprobes adapted for KPFM, EFM, C-AFM, and/or thermal functionalities, without MFM functionality, can be made of a single material (e.g. metallic or metal-like materials) with or without post-growth treatments such as curing or purification. In contrast, nanoprobes adapted for MFM in addition to C-AFM and/or thermal functionalities may be produced from at least two materials, respectively for magnetic sensing (magnetic materials) and electric current-based operation (electrically conductive materials for C-AFM, KPFM, EFM, SThM, NH, etc.). Concerning the material deposition sequence, different approaches can be used depending on the final requirements, for example, to adapt the design to boundary conditions such as the electrode layout on the cantilever. Another such design consideration may be the ability to see the tip of the nanoprobe from the backside of the cantilever. For SEM guided area selection, for example, this may be ideal as it allows extremely precise nanoprobe positioning. Possible designs to allow for such visibility from the backside include, for example, holes or slits in the cantilever or a fully tilted arrangement of the entire nanoprobe (e.g. via tilted fabrication or a special cantilever with tapered front parts).

Figure 7:
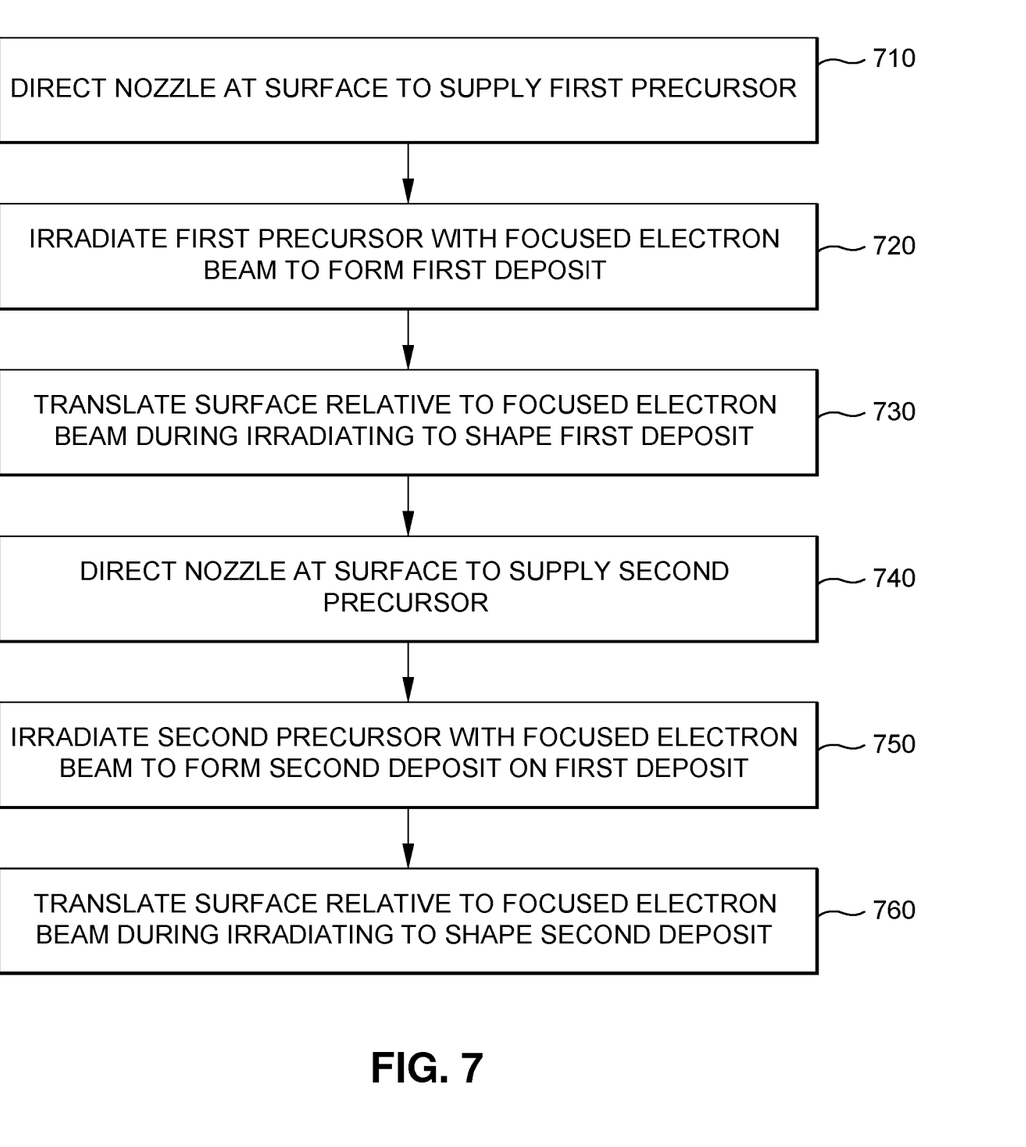
FIG. 7 is an example operational flow for fabricating a multifunctional scanning probe microscopy nanoprobe according to an embodiment of the present disclosure.

FIG. 7 is an example operational flow for fabricating a multifunctional scanning probe microscopy nanoprobe such as the nanoprobe 100, 200, 300, 400 or variants thereof according to an embodiment of the present disclosure. The operational flow may make use of an additive direct-write fabrication technology such as 3D focused electron beam induced deposition (3D-FEBID). The operational flow may begin with directing a nozzle of a gas injection system at a surface to supply molecules of a first precursor to the surface (step 710). The surface may be, for example, a flat cantilever 110 of the nanoprobe 100, 200, 300, 400 to be fabricated. Alternatively, the surface may be a complete pre-existing scanning probe microscopy nanoprobe including a coated or uncoated cone or other protrusion on top of which the nanopillar 130, 240, 340, 440 etc., tapered structure 120, etc. is to be fabricated (e.g. in order to produce a nanoprobe 100, 200, 300, 400 having a smaller apex radius than the preexisting nanoprobe). Depending on the intended functionality of the nanoprobe, the first precursor may be a magnetic, electrically conductive, or electrically insulating material, for example.

While a portion of the precursor molecules are adsorbed in the surface, the operational flow of FIG. 7 may continue with irradiating the molecules of the first precursor with a focused electron beam to dissociate the molecules of the first precursor into volatile fragments that leave the surface and non-volatile fragments that form a first solid deposit on the surface (step 720). During the irradiating of the first precursor, the operational flow may continue with translating the surface relative to the focused electron beam, for example, by moving the focused electron beam and/or moving an x-y stage holding the surface being irradiated (step 730). By translating the surface relative to the focused electron beam in this way, the first solid deposit may be shaped in three dimensions as desired, with the angle of lines and other shapes in three-dimensional space depending on the speed of translation and the speed of deposition. For example, in the case of fabricating the tapered structure 210 of the nanoprobe 100, the surface may be translated relative to the focused electron beam to produce consecutive rings of decreasing radius, one on top of the other.

Once the first solid deposit has been fabricated as desired, for example, in the shape of the tapered structure 210 of the nanoprobe 100, in the shape of the electrodes 220, 320, 420 of the nanoprobe 200, 300, 400, or in the shape of the combined electrode 220 and nanobridge 230 of the nanoprobe 200, for example, the operational flow of FIG. 7 may continue with directing the same or a different nozzle of the gas injection system at the surface to supply molecules of a second precursor to the surface (step 740). The second precursor may also depend on the intended functionality of the nanoprobe, with the use of a different precursor allowing for multimodal operation of the nanoprobe as described herein. For example, in the case of the nanoprobe 100, one of the first and second precursors may yield a solid deposit having greater electrical conductivity while the other yields a solid deposit that exhibits ferromagnetism.

With a portion of the molecules of the second precursor having been adsorbed into the first solid deposit, the operational flow may continue with irradiating the molecules of the second precursor with the focused electron beam to dissociate the molecules of the second precursor into volatile fragments that leave the surface and non-volatile fragments that form a second solid deposit on the first solid deposit (step 750). During the irradiating of the first precursor, the surface may be translated relative to the focused electron beam to shape the second solid deposit in three dimensions as desired (step 760). For example, in the case of fabricating the nanobridge 330, 430 of the nanoprobe 330, 430, the surface may be translated relative to the focused electron beam to produce curved nanowires. In the case of fabricating the nanopillar 130, 240, 340, 440 of the nanoprobe 100, 200, 300, 400, the surface may be held stationary relative to the focused electron beam, with step 760 being omitted in some cases.

Figure 8:
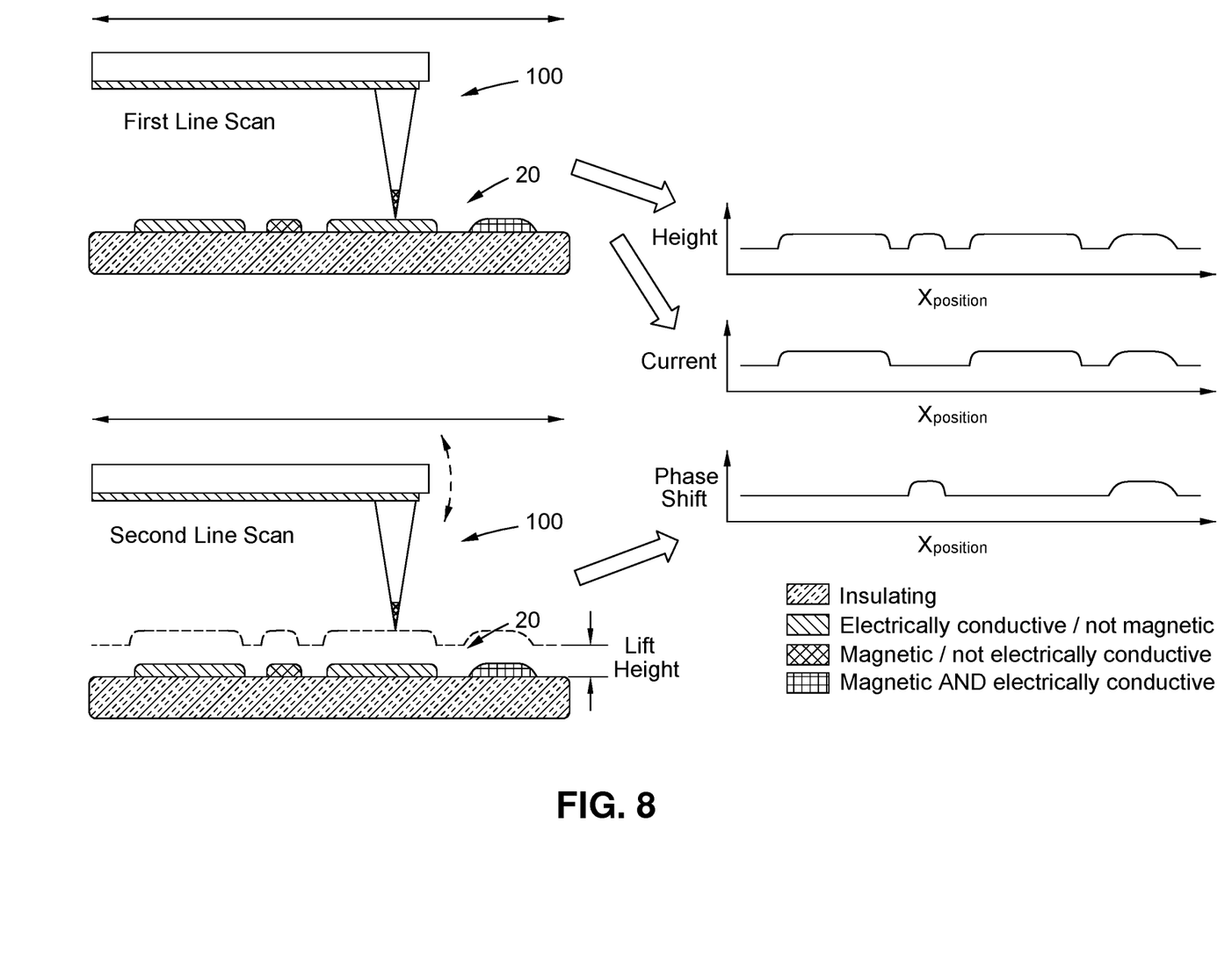
FIG. 8 is a diagram showing an example of simultaneous multi-mode operation during scanning probe microscopy according to an embodiment of the present disclosure.

FIG. 8 is a diagram showing an example of simultaneous multi-mode operation during scanning probe microscopy according to an embodiment of the present disclosure. Traditionally, C-AFM, MFM, KPFM, EFM, SThM, and NH (e.g. via tSPL) are done in separate experiments due to the different operation principles and different nanoprobes required. Owing to the innovations disclosed herein, the need for different nanoprobes may be eliminated as different functionalities can be integrated into a single nanoprobe using direct-write fabrication technologies such as 3D-FEBID and the disclosed morphological designs, varying materials, and tailored post-growth treatments such as curing and purification. The diagram of FIG. 8 provides an illustration of how the disclosed multifunctional nanoprobes may be used to implement new scanning probe microscopy operation modes for multi-modal operation.

In general, C-AFM, SThM and NH require permanent contact between the sample and the probe. Hence, these modes are performed in contact mode, with electric current and voltage data being gatherable simultaneously with morphological height data (and in some cases friction, adhesion and other data). In contrast to these contact-based operation modes, which can be realized via a single-pass approach, MFM, EFM and KPFM work very differently. Here, the cantilever oscillates at its mechanical resonance frequency, where the tip (e.g. nanopillar) slightly "taps" the surface. This may sometimes be referred to as dynamic mode, tapping, resonance, or intermittent mode. In addition to the cantilever oscillation amplitude, the phase shift between excitation oscillation and detection oscillation may be constantly monitored as well, which contains manifold information, including (but not limited to) long-range magnetic forces (e.g. for MFM) and electric forces (e.g. for EFM or KPFM) originating from the surface. To separate between short- and long-range magnetic and electric forces, a two-pass approach may be used: first, the nanoprobe scans a single line to access the surface profile and optionally electric current for purposes of C-AFM, etc. (main-pass). Next, the tip of the nanoprobe is lifted at the turnaround point by a variable lift height and the scanner then moves the tip along the same surface line in a constant distance according to the previously gathered main-pass profile (lift-pass).

If a magnetic or metallic tip is used and the lift height is larger than short range forces, magnetic and/or electric forces between the sample 20 and the tip change the phase shift, which is recorded along the second lift-pass. By that, magnetic and electric information can be accessed in a laterally resolved manner. The materials of the tip then decide which long-range forces are detected: magnetic materials for MFM and metallic or metal-like materials EFM or KPFM. While MFM and EFM give more qualitative information about the lateral distribution of magnetic and electric properties, KPFM allows quantitative 2D mapping of surface potential variations with slightly reduced lateral resolution. To realize KPFM functionality, additional fast electronics may be implemented that vary the voltage applied to the tip in each XY point along the lift-pass line to nullify the potential difference between the sample 20 and the tip, giving the quantitative KPFM signal in a laterally resolved manner. Despite their individual difference, all three modes—MFM, EFM, KPFM—require dynamic operation in combination with the multi-pass approach.

The disclosed two-pass mode can combine contact- and dynamic-mode operation in a single scan, without stopping the operation, thus realizing simultaneous multimode operation. Depending on the individual nanoprobe used, the main-pass can be performed in contact mode to enable C-AFM, SThM, and/or NH (e.g. tSPL), while lift-passes can be done in dynamic mode using a specified lift height to perform MFM, EFM and/or KPFM immediately thereafter. The operation principle is not limited to two passes but can be further expanded to execute, for example, height, friction, and C-AFM measurements in a first pass (contact mode), followed by EFM measurements in a second pass (dynamic mode), followed by KPFM measurements in a third pass (dynamic mode with an additional feedback loop to realize KPFM functionality), followed by MFM measurements in a fourth pass (dynamic mode), all in a single scan using a single nanoprobe. Various combinations of consecutive passes in different modes can be realized without changing the nanoprobe or stopping the measurement. In this way, a large amount of data may be efficiently collected without losing the precise scanning position on the sample 20.

As shown in FIG. 8 by way of example, a first line scan (top-left image) may be done in contact mode to produce laterally resolved height and current information as shown at the right by the top and center scan profiles. To realize such C-AFM operation, the nanoprobe may comprise metallic or metal-like materials. In the illustrated example showing the nanoprobe 100, the nanopillar 130 may be made of an electrically conductive material as described above, for example. As shown, the current signal includes the lateral positions of electrically conductive regions on the sample 20, while the height signal represents the overall topography of the sample 20. After finishing that line scan (which may itself involve a bidirectional forward and backward movement), the tip may be lifted by a small distance and then brought into mechanical resonance, e.g. by a piezo element operatively coupled to the cantilever 110, according to an intrinsic resonance frequency that may be determined upfront during a calibration procedure. Once in oscillation (bottom-left image), the tip may then follow the height profile that was gathered from the first scan (represented by the dashed line at the lift height) in order to maintain the vertical distance along all features during this second line scan. The interaction between a magnetic or electrical surface feature and a magnetic or conductive element in the nanoprobe may shift the phase between the excitation oscillation (e.g. the piezo oscillation) and the detected oscillation (e.g. a self-sensing element readout), which forms a laterally resolved MFM, EFM, or KPFM signal. In the illustrated example showing the nanoprobe 100, the tapered structure 120 may be made of a ferromagnetic material as described above, resulting in a phase shift indicative of an MFM signal as shown on the right by the bottom scan profile. As shown, the MFM signal includes the lateral positions of magnetic regions on the sample 20. In this way, a dual scan in very different operation conditions (e.g. cantilever deflection during contact vs. amplitude decay during dynamic oscillation) can provide simultaneous information.

It should be noted that the diagram of FIG. 8 is only one example and that other nanoprobes produced according to the innovations described herein, including the nanoprobes 100, 200, 300, 400 and their variants, may be used for many different combinations of measurements and functions. For example, the disclosed nanoprobes may be used to perform thermal heating (e.g. for tSPL) and sequential read out of magnetic properties. As noted above, the number of scans need not be limited to two, and it is contemplated that three, four, or more scans may be executed as part of the same workflow without needing to replace the nanoprobe.

Figure 9:
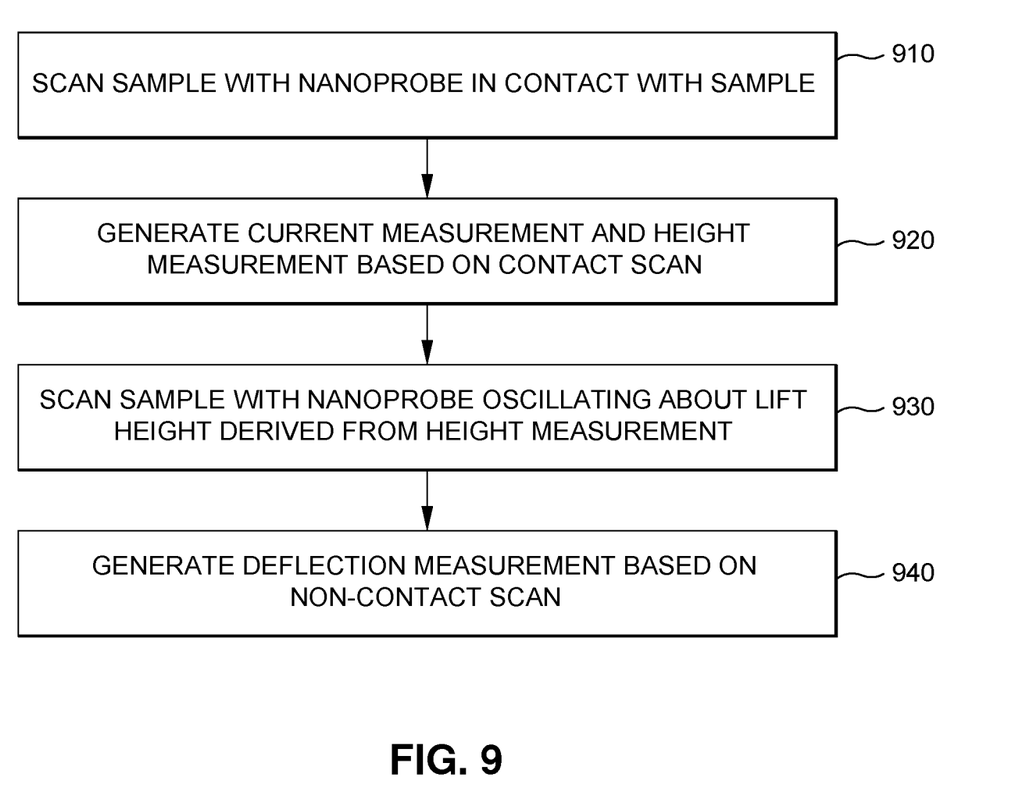
FIG. 9 is an example operational flow for conducting simultaneous multi-mode operation during scanning probe microscopy according to an embodiment of the present disclosure.

FIG. 9 is an example operational flow for conducting simultaneous multi-mode operation during SPM according to an embodiment of the present disclosure. The operational flow is an example of one of many possible scanning processes that can be performed according to the principles described in relation to FIG. 8. The operational flow may be performed using a scanning probe microscope equipped with a multifunctional nanoprobe made of a first material having greater electrical conductivity and a second material that exhibits ferromagnetism, such as the nanoprobe 100 shown in FIG. 2. The operational flow may begin with scanning a sample 20 with the nanoprobe in contact with the sample 20 (step 910) to produce a current measurement indicative of a current flowing through the sample 20 and a height measurement indicative of a topography of the sample 20 (step 920). Examples of the current and height measurements generated based on such a contact scan are shown in the center and top scan profiles on the right side of FIG. 8. After the contact scan, the operational flow may continue with scanning the sample with the nanoprobe oscillating about a lift height derived from the height measurement (step 930) to produce a deflection measurement indicative of a magnetic or other non-contact force (e.g. electrostatic force between the nanoprobe and the sample, surface potential, etc.) between the sample and the nanoprobe (step 940). An example of such a measurement is shown in the bottom scan profile on the right side of FIG. 8. In this case, the deflection measurement is in the form of a phase shift plot representing the phase lag between the excitation and detection oscillations of the cantilever.

Figure 10:
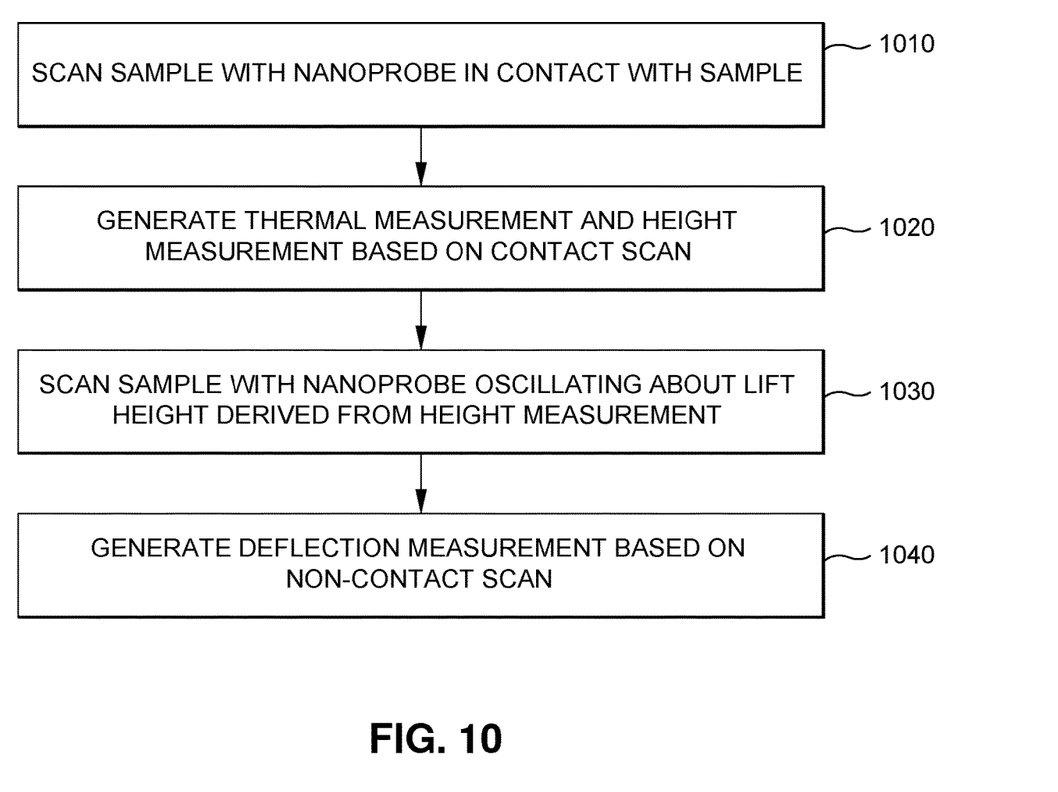
FIG. 10 is another example operational flow for conducting simultaneous multi-mode operation during scanning probe microscopy according to an embodiment of the present disclosure.

FIG. 10 is another example operational flow for conducting simultaneous multi-mode operation during scanning probe microscopy according to an embodiment of the present disclosure. The operational flow is similar to the operational flow described in relation to FIG. 9 and includes steps 1010, 1030, and 1040 that are the same as steps 910, 930, and 940, respectively. However, instead of generating a current measurement and height measurement based on the contact scan as described in relation to step 920 of FIG. 9, the operational flow of FIG. 10 includes generating a thermal measurement indicative of a temperature of the sample 20 and a height measurement indicative of a topography of the sample 20. To this end, the operational flow of FIG. 10 may be performed using a scanning probe microscope equipped with a nanoprobe having thermal functionality such as the nanoprobe 200, 300, 400 of FIG. 2, 3, or 4, with or without addition C-AFM functionality, for example.

Throughout the above description, 3D-FEBID is used as an exemplary direct-write fabrication technology for producing the disclosed multifunctional nanoprobes. However, the disclosure is not intended to be so limited. For example, 3D focused ion beam induced deposition (3D-FIBID) may be used instead, which may employ a FIB microscope in place of the SEM, for example.

In the above description, several references are made to atomic force microscopy (AFM) as an example of the scanning probe microscopy (SPM) that can be performed using the nanoprobes and methods described herein. Another example of SPM that may be performed using the disclosed nanoprobes and methods and may thus benefit from the disclosed innovations is scanning tunneling microscopy (STM).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A multi-functional scanning probe microscopy nanoprobe comprising:
    a cantilever;
    a tapered structure formed on a surface of the cantilever from a first material; and
    a nanopillar formed on an apex of the tapered structure from a second material, the nanopillar extending parallel to a deflection direction of the cantilever and perpendicular to the cantilever;
    wherein one of the first and second materials has greater electrical conductivity and the other exhibits ferromagnetism.

2. The nanoprobe of claim 1 wherein the first material exhibits ferromagnetism and the second material has the greater electrical conductivity.

3. The nanoprobe of claim 2 wherein the first material includes one or more elemental ferromagnetic species selected from the group consisting of iron, cobalt, nickel, gadolinium, terbium, and dysprosium.

4. The nanoprobe of claim 2 wherein the first material includes one or more ferromagnetic alloys selected from the group consisting of $Co_3Fe$, $CrO_2$, $CrBr_3$, and $EuS$.

5. The nanoprobe of claim 2, wherein the second material includes one or more noble metals selected from the group consisting of platinum, palladium, gold, and silver.

6. The nanoprobe of claim 1, wherein the tapered structure comprises a hollow cone or pyramid.

7. A scanning probe microscope comprising:
    the nanoprobe of claim 1; and
    a detector for detecting a deflection of the cantilever.

8. A method of simultaneous multi-mode operation during scanning probe microscopy, the method comprising:
    scanning a sample with a multi-functional scanning probe microscopy nanoprobe in contact with the sample to produce a current measurement indicative of a current flowing through the sample and a height measurement indicative of a topography of the sample, the nanoprobe comprising a cantilever, a tapered structure formed on a surface of the cantilever from a first material, and a nanopillar formed on an apex of the tapered structure from a second material, wherein one of the first and second materials has greater electrical conductivity and the other exhibits ferromagnetism; and,
    thereafter, scanning the sample with the nanoprobe oscillating about a lift height derived from the height measurement to produce a deflection measurement indicative of a magnetic force between the sample and the nanoprobe.

9. A multi-functional scanning probe microscopy nanoprobe comprising:
    a cantilever;
    first and second electrodes formed on a surface of the cantilever from a first material;
    a nanobridge bridging the first and second electrodes; and
    a nanopillar formed on the nanobridge;
    wherein either one or both of the nanobridge and the nanopillar is formed from a second material, and one of the first and second materials exhibits ferromagnetism.

10. The multi-functional scanning probe microscopy nanoprobe of claim 9, wherein the other of the first and second materials has greater electrical conductivity.

11. The nanoprobe of claim 10 wherein the first material exhibits ferromagnetism and the second material has the greater electrical conductivity.

12. The nanoprobe of claim 11 wherein the first material includes one or more elemental ferromagnetic species selected from the group consisting of iron, cobalt, nickel, gadolinium, terbium, and dysprosium.

13. The nanoprobe of claim 11 wherein the first material includes one or more ferromagnetic alloys selected from the group consisting of $Co_3Fe$, $CrO_2$, $CrBr_3$, and $EuS$.

14. The nanoprobe of claim 11, wherein the second material includes one or more noble metals selected from the group consisting of platinum, palladium, gold, and silver.

15. A scanning probe microscope comprising:
    the nanoprobe of claim 10; and
    a detector for detecting a deflection of the cantilever.

16. A method of simultaneous multi-mode operation during scanning probe microscopy, the method comprising:
    scanning a sample with the nanoprobe of claim 10 in contact with the sample to produce a thermal measurement indicative of a temperature of the sample and a height measurement indicative of a topography of the sample; and,
    thereafter, scanning the sample with the nanoprobe oscillating about a lift height derived from the height measurement to produce a deflection measurement indicative of a magnetic force between the sample and the nanoprobe.

17. A method of fabricating a multi-functional scanning probe microscopy nanoprobe, the method comprising:
    directing a nozzle of a gas injection system at a surface to supply molecules of a first precursor to the surface;
    irradiating the molecules of the first precursor with a focused electron beam to dissociate the molecules of the first precursor into volatile fragments that leave the surface and non-volatile fragments that form a first solid deposit on the surface;
    translating the surface relative to the focused electron beam during said irradiating the molecules of the first precursor to shape the first solid deposit in three dimensions;
    directing a nozzle of the gas injection system at the surface to supply molecules of a second precursor to the surface; and
    irradiating the molecules of the second precursor with the focused electron beam to dissociate the molecules of the second precursor into volatile fragments that leave the surface and non-volatile fragments that form a second solid deposit on the first solid deposit;
    wherein one of the first and second solid deposits has greater electrical conductivity and the other exhibits ferromagnetism.

18. The method of claim 17 wherein the first solid deposit exhibits ferromagnetism and the second solid deposit has the greater electrical conductivity.

19. The method of claim 18 wherein the first solid deposit includes one or more elemental ferromagnetic species selected from the group consisting of iron, cobalt, nickel, gadolinium, terbium, and dysprosium.

20. The method of claim 18 wherein the first solid deposit includes one or more ferromagnetic alloys selected from the group consisting of $Co_3Fe$, $CrO_2$, $CrBr_3$, and $EuS$.

21. The nanoprobe of claim 18, wherein the second solid deposit includes one or more noble metals selected from the group consisting of platinum, palladium, gold, and silver.

22. The method of claim 17, wherein the surface is a surface of a pre-existing scanning probe microscopy nanoprobe.

* * * * *